United States Patent
Enenkel et al.

(10) Patent No.: US 11,884,338 B2
(45) Date of Patent: Jan. 30, 2024

(54) SELF-BALANCING DRIVERLESS TRANSPORT VEHICLE

(71) Applicant: Körber Supply Chain Logistics GmbH, Constance (DE)

(72) Inventors: Peter Enenkel, Constance (DE); Michael Matt, Goerwihl (DE); Max Umbach, Constance (DE)

(73) Assignee: Körber Supply Chain Logistics GmbH, Constance (DE)

( * ) Notice: Subject to any disclaimer, the term of this patent is extended or adjusted under 35 U.S.C. 154(b) by 190 days.

(21) Appl. No.: 17/432,560

(22) PCT Filed: Feb. 17, 2020

(86) PCT No.: PCT/EP2020/054093
§ 371 (c)(1),
(2) Date: Aug. 20, 2021

(87) PCT Pub. No.: WO2020/169528
PCT Pub. Date: Aug. 27, 2020

(65) Prior Publication Data
US 2022/0144353 A1 May 12, 2022

(30) Foreign Application Priority Data
Feb. 20, 2019 (EP) .................... 19158310

(51) Int. Cl.
*B62D 37/04* (2006.01)
*B62D 61/00* (2006.01)

(52) U.S. Cl.
CPC ............. *B62D 37/04* (2013.01); *B62D 61/00* (2013.01)

(58) Field of Classification Search
CPC ........ B62D 37/04; B62D 37/06; B62D 61/00; B60P 1/00; B65G 67/00; B65G 41/00;
(Continued)

(56) References Cited

U.S. PATENT DOCUMENTS

| 10,328,836 B2 | 6/2019 | Purwin et al. |
| 2008/0230285 A1* | 9/2008 | Bewley .................. B62D 37/00 901/1 |

(Continued)

FOREIGN PATENT DOCUMENTS

| CN | 107037825 A | * | 8/2017 | ............. B62D 61/00 |
| CN | 207931835 U | * | 10/2018 | ......... B60G 17/0165 |

(Continued)

OTHER PUBLICATIONS

Kim, Apparatus For Conveying Product and Method Thereof, Apr. 27, 2017, EPO, KR 20170045503 A, Machine Translation of Description (Year: 2017).*

(Continued)

*Primary Examiner* — Paul N Dickson
*Assistant Examiner* — Matthew D Lee
(74) *Attorney, Agent, or Firm* — Price Heneveld LLP

(57) ABSTRACT

A driverless transportation vehicle for piece goods has a chassis, a traction drive, a load-transfer device with a load-transfer drive, and a control system. The chassis has at least two wheels arranged on an axle and the traction drive is configured to drive the wheels. The load-transfer device picks up an item of piece goods and transfer its center of mass on the vehicle. The control system controls the traction drive to prevent the transportation vehicle from tilting about the axle of the chassis, while the driverless transportation vehicle balances on only the at least two wheels. The control system additionally actuates the load-transfer drive in such a way that the position of the center of mass of the cargo is adapted for a driving maneuver that is to be carried out.

24 Claims, 14 Drawing Sheets

(58) Field of Classification Search
CPC ...... B65G 41/007; B65G 41/008; B23Q 7/00; G05D 2201/0216
See application file for complete search history.

(56) References Cited

U.S. PATENT DOCUMENTS

| | | | | |
|---|---|---|---|---|
| 2010/0057319 | A1* | 3/2010 | Inaji | G05D 1/0891 |
| | | | | 180/218 |
| 2010/0219011 | A1* | 9/2010 | Shimoyama | B62D 37/04 |
| | | | | 180/218 |
| 2015/0224941 | A1* | 8/2015 | Bernstein | B62D 61/00 |
| | | | | 180/21 |
| 2017/0313230 | A1 | 11/2017 | Valtanen | |
| 2018/0178381 | A1* | 6/2018 | Lee | B62D 61/00 |
| 2020/0122797 | A1* | 4/2020 | Weiss | B62D 61/00 |
| 2020/0124159 | A1* | 4/2020 | Weiss | G05D 1/0891 |
| 2023/0004173 | A1* | 1/2023 | Jo | B62D 21/00 |

FOREIGN PATENT DOCUMENTS

| | | | | |
|---|---|---|---|---|
| CN | 111907615 A | * | 11/2020 | ........... B60K 7/0007 |
| CN | 111976862 A | * | 11/2020 | ............. B62D 61/00 |
| EP | 2017172 A1 | * | 1/2009 | ............. B60L 15/20 |
| EP | 2017172 A1 | | 1/2009 | |
| JP | 2021181362 A | * | 11/2021 | |
| KR | 20170045503 A | * | 4/2017 | ........... B65G 41/008 |

OTHER PUBLICATIONS

Single-axle vehicles, AddSeat 4, YouTube Video: https://www.youtube.com/watch?v=ZhhRBUdnlil.
Single-axle vehicles, NINO, YouTube Video: https://www.youtube.com/watch?v=3Tie5-kgHlk.
Single pendulum, YouTube Video: https://www.youtube.com/watch?v=6diEXY6JVPM.
Double pendulum, YouTube Video: https://www.youtube.com/watch?v=ew-yP6uZbrU.

* cited by examiner

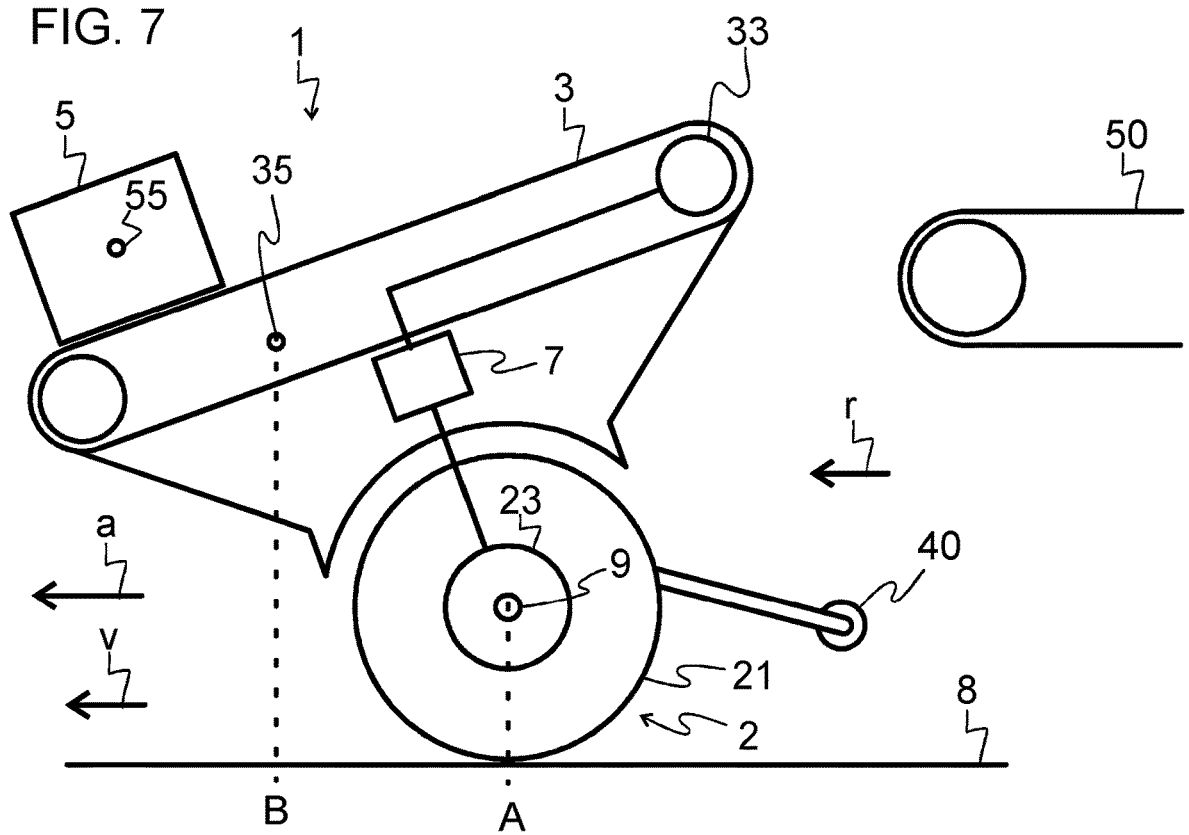
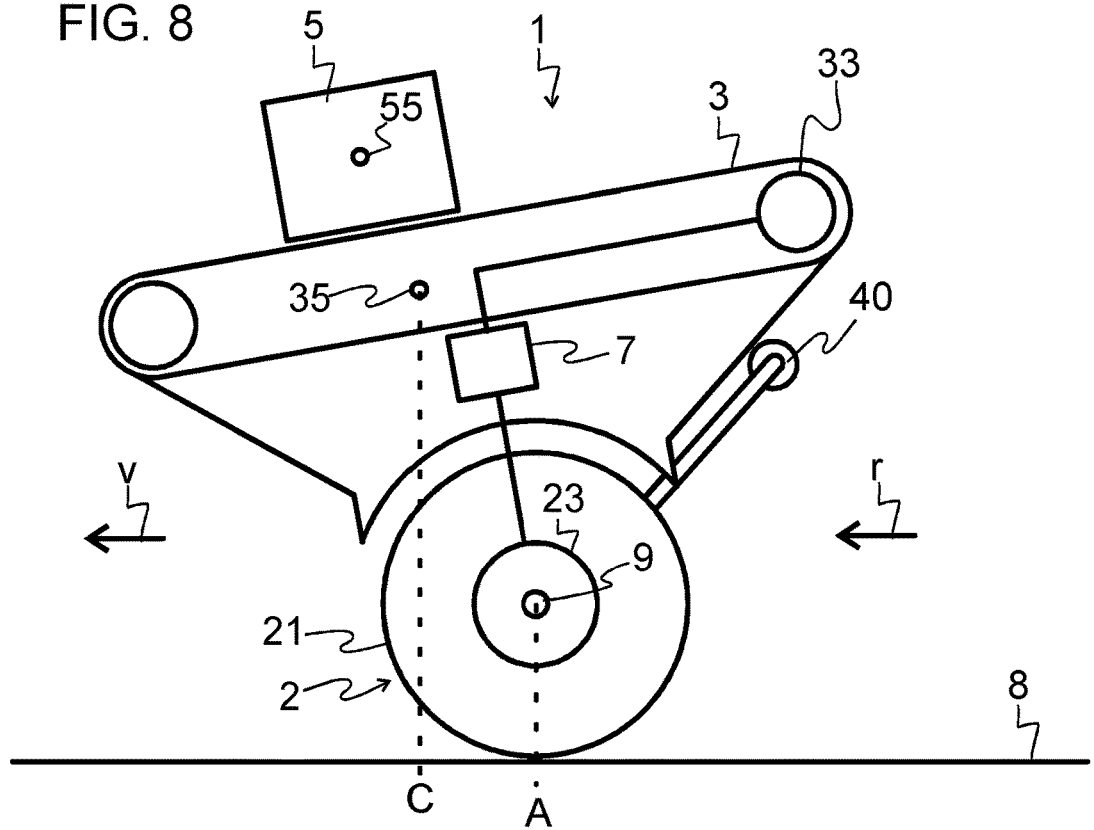

SELF-BALANCING DRIVERLESS TRANSPORT VEHICLE

FIELD AND BACKGROUND OF THE INVENTION

The invention relates to the technical field of driverless transport vehicles (AGV) for transportation of piece goods and also to the use of such transport vehicles for transporting, distributing and/or sorting of piece goods, as well as to a sorting system that comprises such transport vehicles.

For driverless transport vehicles, also referred to as Automated Guided Vehicles (AGV), numerous and very different drive concepts are used nowadays, depending on the application case. Specific challenges emerge that are only inadequately satisfied by the available concepts for the application case of transport, storage, order picking and sorting of general cargo in the postal and the airport environment, such as baggage, parcels and bulky goods.

Previous uses of AGVs also show a specific kinematic construction for a defined application case in a defined domain.

These specific challenges are:
Inhomogeneous shape and wrapping material of the general cargo, which can result in the items of general cargo rolling, tipping, sliding, tilting or getting caught on each other;
Inhomogeneous mass distribution leads to a center of mass that does not match the geometrical center of mass, as would be assumed from the external form of the item of piece goods;
Also the center of mass can shift in an undefined way during transport, for example when the general cargo is a package or an item of baggage with loose contents;
It is desirable to be able to implement vertically running driving profiles, with rough surfaces, as well as to be able to be overcome ascents, descents, helixes, steps and gaps;
A simple adaptation to existing infrastructure is also desirable (migration).

Previously AGVs have predominantly been constructed with more than one axle, thus involving statically stabilized systems.

In order to be able to overcome uneven ground structures different concepts are pursued:
Statically defined three-point support (e.g. three wheels);
Boogie drive train technology (as in the Mars rover)
Sprung support wheels;
Sprung individual wheel suspension (as in current automobiles).

These concepts are based on expensive chassis. They can thus only have satisfied the challenges listed above through significant costs for the chassis itself.

From another technical field of transport of relatively fixed masses, such as people or goods, self-balancing, single-axle vehicles are known and are documented in the YouTube® links cited by the applicant.

These links disclose self-balancing systems embodied as a wheelchair in accordance with Segway® principle, such as for example the NINEBOT NINO. People and also objects in a fixed position can be transported on these.

For inhomogeneous goods with an undefined movable center of mass such apparatuses are not known and people and also goods are loaded into a suitable position of the single-axle, self-balancing vehicle through human intervention.

SUMMARY OF THE INVENTION

The underlying object of the present invention is therefore to provide a concept by which piece goods (=general cargo) is able to be transported by means of an AGV in a manner that is as flexible and as low-cost as possible.

This object is achieved by the concepts described in the independent claims.

In accordance with the invention a driverless transport vehicle for piece goods is presented. The driverless transport vehicle comprises a chassis, a traction drive, a load transfer means installed on the driverless transport vehicle with a load transfer drive and a control system. The chassis comprises at least two wheels arranged on an axle. The traction drive is embodied to drive the at least two wheels. The load transfer means is embodied to pick up an item of piece goods and to transfer its center of mass on the driverless transport vehicle. The control system is embodied to control the traction drive so that the transport vehicle is prevented from tilting about the axle of the traction drive while the driverless transport vehicle balances on only the at least two wheels arranged on the axle. The control system is moreover embodied to activate the load transfer drive so that the center of mass of the item of piece goods is adapted for a driving maneuver to be carried out.

In accordance with an exemplary embodiment the load transfer means is embodied as a conveyor means, for example as a conveyer line, conveyer belt, belt conveyer or roller conveyor. These allow a reliable and simple adaptation of the center of mass position of the item of piece goods. In particular conveyor belts and belt conveyors allow an especially reliable adaptation of the center of mass position of cumbersome general cargo.

In accordance with an exemplary embodiment the wheels are able to be driven individually. This allows the driverless transport vehicle to be highly maneuverable.

In accordance with an exemplary embodiment the chassis comprises precisely two wheels arranged at the sides on the axle of the driverless transport vehicle. This results in a very simple construction of the driverless transport vehicle.

In accordance with an exemplary embodiment the load transfer means is embodied to transfer the center of mass of the item of piece goods on the driverless transport vehicle in the direction of travel and against the direction of travel. This allows especially effective options for adapting the location of the center of mass of the general cargo for different driving maneuvers.

Self-balancing single-axle ground transport vehicles AGV (self-balancing AGV) exhibit advantages in general cargo sorting in respect of:
Costs
  Minimum number of drive elements
  Very simple kinematic structure of the chassis
  No lifts required in the sorting system layout
Climbing Ability
  Maximum throughput over a number of levels
Overcoming Obstacles
  Steps, indoor steps, uneven route surfaces and contamination, grating surfaces and steps, convex, concave and deviating routes, ramps . . .
Acceleration of Load Carriers and Loads Attached to High Legs
  Loading of high roller wagons with no metal structure for the AGV (see GrayOrange, Geek+ and AIC)
The disadvantages or problems of this self-balancing AGV solution are:

In the event of system shutdown, an emergency stop or an energy system outage there is the danger of the self-balancing AGV tipping over;

Angled position of the conveyor system when the cargo is ejected by balancing about the dynamic general center of mass;

High energy consumption of the control dynamics as a result of the relative instability during the dynamic receiving and discharging of cargo during loading or during unloading at the end point (see FIGS. 20 and 21).

In accordance with an exemplary embodiment the driverless transport vehicle comprises a safety system for supporting the self-balancing AGV in the event of a system shutdown, an emergency stop or an energy system outage. In particular with when moving over ascending or descending paths, particular precautions are desirable here, so that the vehicle comes safely to a halt within the legally specified framework for in-house sorting systems (machine guidelines).

In accordance with an exemplary embodiment the driverless transport vehicle additionally comprises a support wheel system or a stand system that is embodied, when the control system is switched off, to ensure that the driverless transport vehicle stands in a stable manner. This allows the driverless transport vehicle to stand in a stable manner even if the control system is switched off. Moreover the support wheel or stand system can also ensure additional stability for demanding driving maneuvers and processes, such as for example during loading of the transport vehicle.

In accordance with an exemplary embodiment the control system is embodied to extend and/or retract the support wheel or stand system for the driving maneuver to be undertaken. This allows a greater versatility in the driving maneuvers able to be undertaken by the driverless transport vehicle.

In accordance with an exemplary embodiment the support wheel system is embodied and arranged, in an extended state, to allow the transport vehicle to be steered in any direction on the travel surface. Thereby the maneuverability of the driverless transport vehicle is not adversely affected by the support wheel system in its extended state.

In accordance with an exemplary embodiment the support wheel system is embodied and arranged to be extended by gravity or with the aid of springs. Thereby no further mechanism or drive is needed for extending the support wheel system.

In accordance with an exemplary embodiment the driverless transport vehicle comprises at least one controllable ratchet or at least one force-controlled brake, which is arranged and embodied in an articulated joint of the support wheel system, to prevent the support wheel system from springing back when in an extended state and to keep one or more wheels of the support wheel system in position on the ground. This ensures that the driverless transport vehicle is supported on the ground.

In accordance with an exemplary embodiment the support wheel system comprises a front support wheel system and also a rear support wheel system, which are each embodied and arranged, in an extended state, to support the transport vehicle in the forwards or backwards direction of travel on an angle of incline of the route present at that point. Despite numerous uneven sections and variable angles of incline of the route, this enables the driverless transport vehicle to be supported thereon.

In accordance with an exemplary embodiment the driverless transport vehicle comprises at least one controllable ratchet or force-controlled brake of at least one wheel support in each case and is embodied to release the wheel support and to latch this again in a position above the route when the driverless transport vehicle tilts.

In accordance with an exemplary embodiment the driverless transport vehicle is embodied to realize a force necessary to extend the support wheel system or the stand system purely mechanically and not by actuators embodied exclusively for this purpose. This allows a simplified construction of the transport vehicle.

In accordance with an exemplary embodiment the control system is moreover embodied to control the load transfer drive so that the position of the center of mass of the item of piece goods is adapted individually for different driving maneuvers to the driving maneuver to be carried out.

In accordance with an exemplary embodiment the transport vehicle comprises different kinematic and control technology driving states.

In accordance with an exemplary embodiment, when a support wheel system is extended, the control system is able to be deactivated. This enables the energy consumed necessary for balancing the driverless transport vehicle to be reduced.

In accordance with an exemplary embodiment, when a support wheel system is extended, the traction drive of the control system is embodied to activate the traction drive in a non-balanced mode.

In accordance with an exemplary embodiment, when a support wheel system is extended, the traction drive of the control system is embodied to activate the traction drive as a differential drive control.

In accordance with an exemplary embodiment the load transfer means is embodied and arranged to eject the item of piece goods from the transport vehicle. This allows a further automation of logistical sequences combined with a simple construction.

In accordance with an exemplary embodiment the driving maneuver comprises driving on an incline and the control system is embodied, for driving on the incline, to activate the load transfer system so that the position of the center of mass of the item of piece goods is shifted in or against the direction of travel. This makes it possible to keep the item of piece goods in a horizontal position despite driving on the incline or at least to adapt the position of the center of mass of the item of piece goods so that the item of piece goods is supported in a less sloping position on the load transfer means than would be the case with a non-adapted position. For driving up an incline the control system can be embodied for example to activate the load transfer drive for driving on the incline so that the position of the center of mass of the item of piece goods is shifted in the direction of travel or that the position of the center of mass of the item of piece goods is positioned in the direction of travel in front of the axle. For driving down an incline the control system can be embodied for example to activate the load transfer drive so that the position of the center of mass of the item of piece goods is shifted against the direction of travel or that the position of the center of mass of the general cargo is positioned in the direction of travel behind the axle.

In accordance with an exemplary embodiment the driving maneuver comprises a braking maneuver and the control system is embodied to activate the load transfer drive for the braking maneuver so that the position of the center of mass of the item of piece goods is shifted against the direction of travel. This allows a shorter braking distance, since otherwise during the braking maneuver, the inertia of the item of piece goods and also of the top part of the transport vehicle would cause the transport vehicle to tilt forwards, which once more would have to be counteracted by an acceleration of the traction drive so that the transport vehicle does not tilt forwards.

In accordance with an exemplary embodiment the driving maneuver comprises a starting-off and accelerating maneuver and the control system is embodied to activate the load transfer drive to the starting-off and accelerating maneuver so that the position of the center of mass of the item of piece goods is shifted in the direction of travel. This allows faster starting-off and accelerating maneuvers, since otherwise the driverless transport vehicle would have to be put into a sloping position by a short acceleration against the intended direction of travel, so that the transport vehicle can then be accelerated once again in the direction of travel without it tilting.

In accordance with an exemplary embodiment the control system 7 is embodied to control the load transfer drive 33 and/or the traction drive 23 so that a receiving surface of the load transfer means on which the item of piece goods 5 rests assumes an intended angle of inclination or comes to rest horizontally.

In accordance with an exemplary embodiment the control system is embodied to control the load transfer drive so that the position of the center of mass of the item of piece goods is adapted for the driving maneuver to be undertaken while the driverless transport vehicle balances on only the at least two wheels arranged on the axle. This allows a wider diversity of possible driving maneuvers able to be carried out by the driverless transport vehicle.

In accordance with the invention a sorting system is also presented. The sorting system comprises a sorting area, a sorting logic and a plurality of driverless transport vehicles in accordance with one of the exemplary embodiments described above. The sorting area comprises at least one loading area and sorting destinations. The loading area is embodied to load the driverless transport vehicles with general cargo. The sorting logic is embodied to guide a transport vehicle loaded with an item of piece goods to a sorting destination assigned to the item of piece goods.

The invention moreover relates to the use of a driverless transport vehicle in accordance with one of the forms of embodiment described for transporting, distributing and/or sorting of general cargo, in particular for transporting, distributing and/or sorting of items of baggage or packages.

BRIEF DESCRIPTION OF THE FIGURES

The invention will be explained in greater detail below for example with the aid of the figures. In the figures:

FIG. 7 shows a schematic side view of the transport vehicle shown in FIGS. 1-3, while it is accelerating;

FIG. 8 shows a schematic side view of the transport vehicle shown in FIGS. 1-3, while it is driving straight ahead;

DETAILED DESCRIPTION OF THE INVENTION

Figure 1:
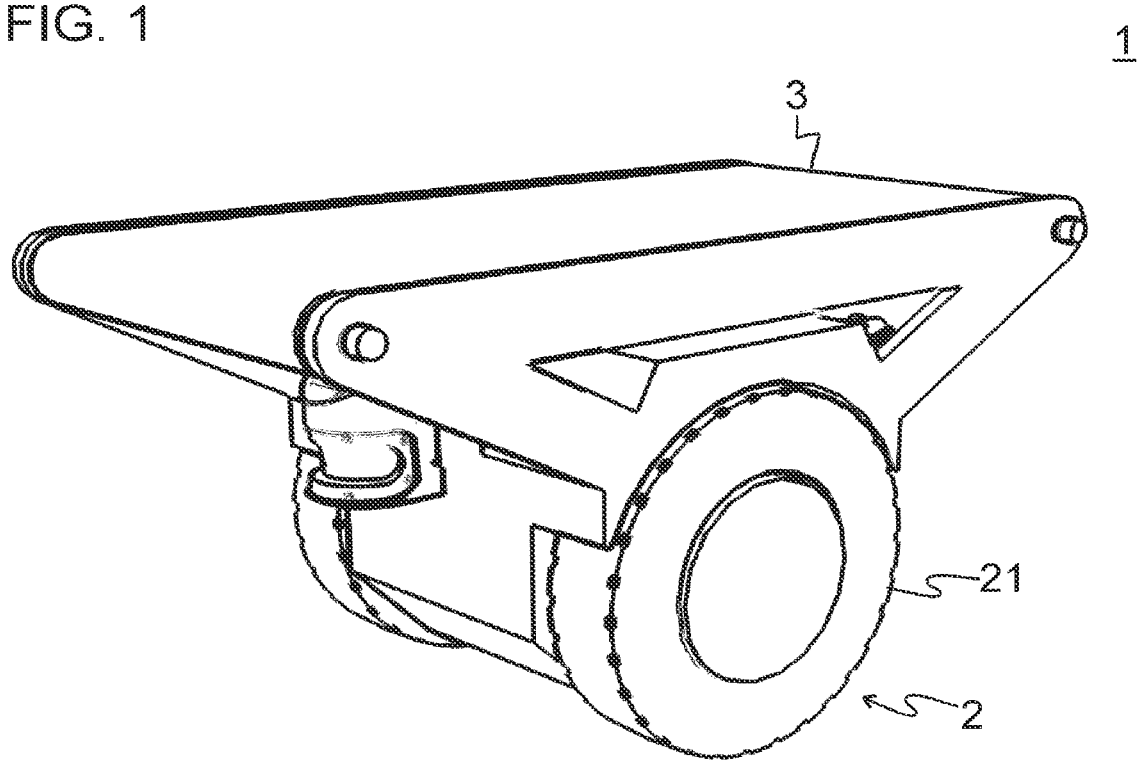
FIGS. 1-3 show perspective views of a driverless transport vehicle in accordance with an exemplary embodiment of the invention.
Figure 2:
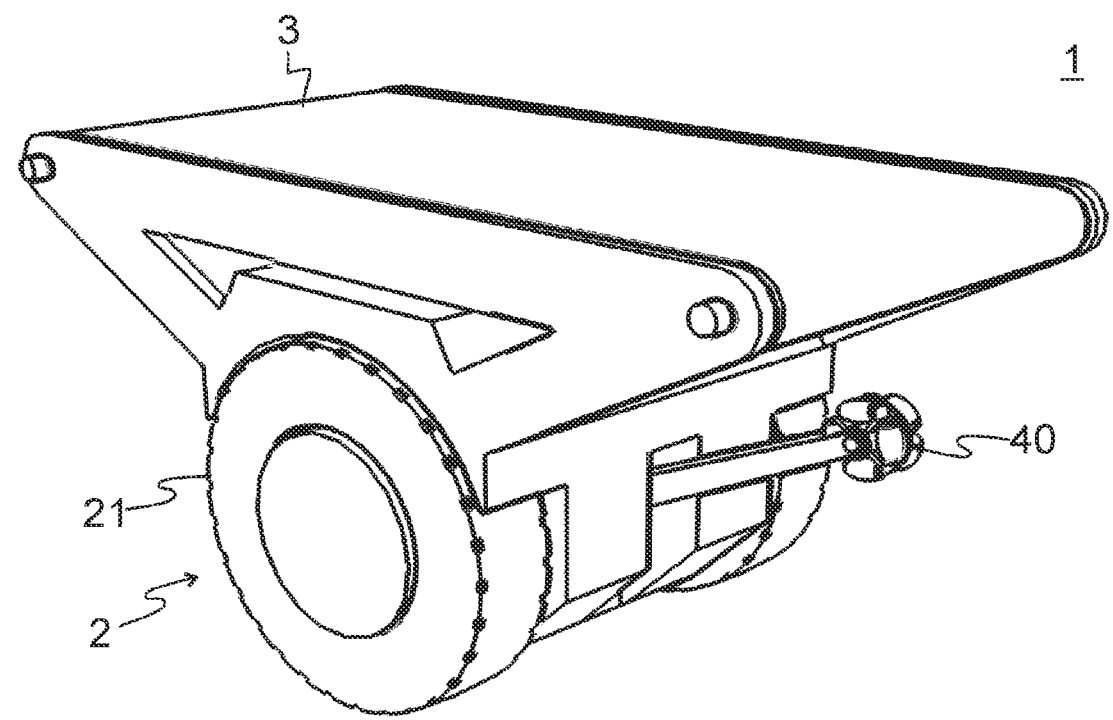
Figure 3:
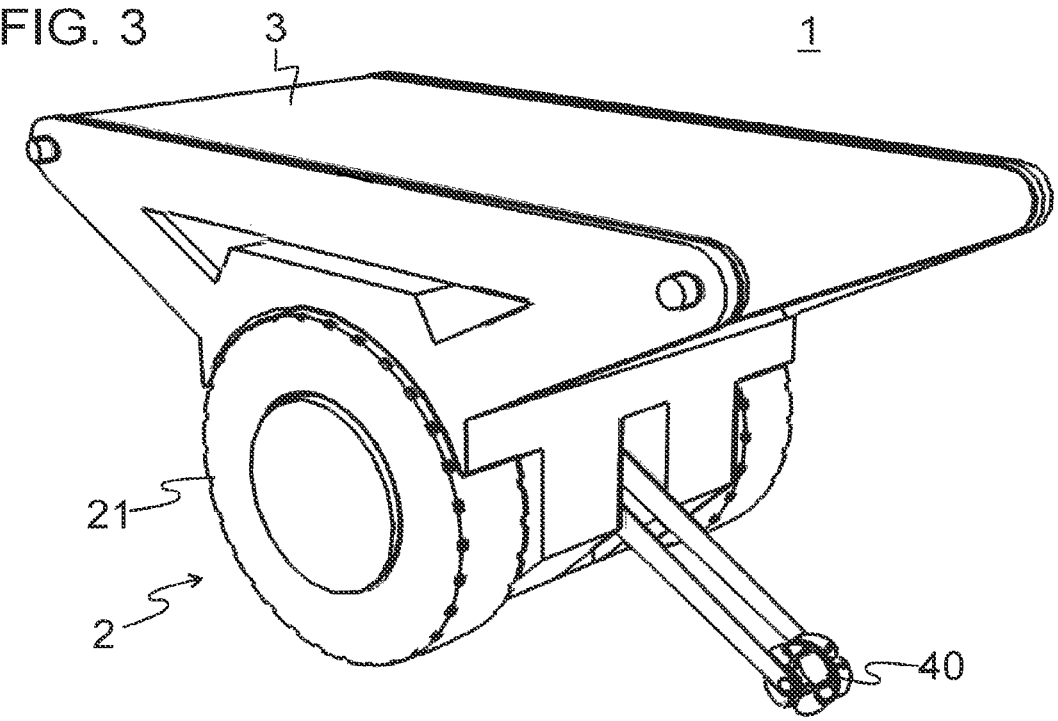

FIGS. 1-3 show perspective views of a driverless transport vehicle 1 in accordance with an exemplary embodiment of the invention. FIGS. 5-11 show side views of the driverless transport vehicle 1 during different maneuvers. The driverless transport vehicle 1 can be used for example for transporting, distributing and/or sorting of general cargo, for example for distributing and/or sorting of items of baggage or packages.

The driverless transport vehicle 1 comprises a single-axle chassis 2, a traction drive 23, a load transfer means 3 installed on the driverless transport vehicle 1 with a load transfer drive 33 and a control system 7.

The load transfer means 3 is embodied to receive an item of piece goods 5 and to transfer its center of mass 55 on the driverless transport vehicle 1 at right angles to the axle 9 in the direction of travel and against the direction of travel. To this end the load transfer means 3 is embodied as a conveyor belt and the load transfer drive 33 is embodied to drive the load transfer means.

The chassis 2 comprises two individually drivable wheels 21 arranged on an axle 9. The traction drive 23 is embodied to drive the at least two wheels 21 individually.

The control system 7 is embodied to control the traction drive 23 so that a tilting of the transport vehicle 1 about the axis 9 of the chassis 2 is prevented while the driverless transport vehicle 1 balances only on the at least two wheels 21 arranged on the axle 9, i.e. while the driverless transport vehicle 1 is in contact with a route 8 or any other surface with only the at least two wheels 21 arranged on the axle 9.

FIGS. 5-11 illustrate how the position of the center of mass 55 of the item of piece goods 5 is adapted for a maneuver to be carried out.

Figure 5:
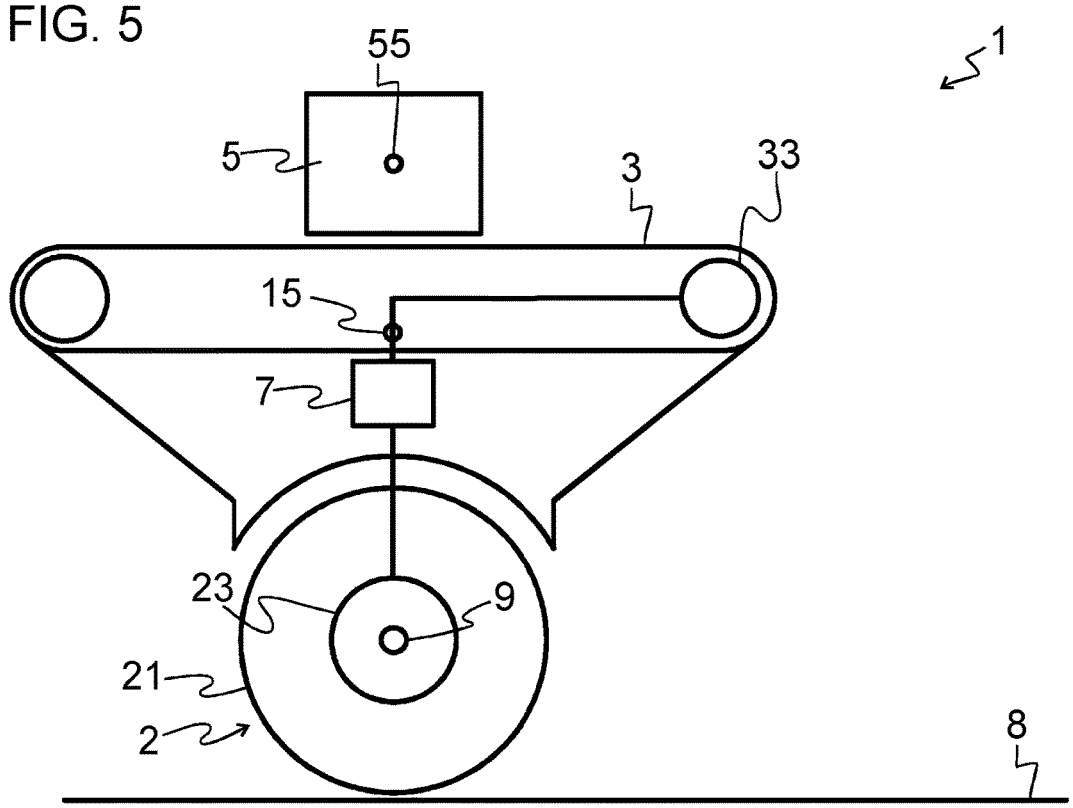
FIG. 5 shows a schematic side view of the transport vehicle shown in FIGS. 1-3, while it is balancing on two wheels arranged on the axle.

FIG. 5 shows the driverless transport vehicle 1 loaded with the item of piece goods 5 during a driving maneuver in which the driverless transport vehicle 1 is resting balanced at one point, i.e. does not have any velocity. The position of the center of mass 55 of the item of piece goods 5 in this case is adapted by the load transfer means 3 so that the total center of gravity of driverless transport vehicle 1 and item of piece goods 5 comes to rest at right angles over the axle 9. In this case it is not necessary for this position to be calculated but it is sufficient for the control system 7 to set this position of the item of piece goods automatically by means of negative feedback, for example by the corrections of the traction drive 23 necessary for balancing being minimized as control variable.

In order to balance the driverless transport vehicle 1 in the unloaded state, i.e. without the item of piece goods 5, the control system 7 will control the traction drive 23 so that the center of gravity 15 of the unloaded transport vehicle 1 balances at right angles above the axle 9. In order to balance the transport vehicle 1 in the loaded state, i.e. with the item of piece goods 5, the control system 7 will control the traction drive 23 so that the common center of gravity 35 of transport vehicle 1 and item of piece goods 5 balances at right angles above the axle 9.

In the exemplary embodiment shown in FIG. 5 the mass distribution of the transport vehicle 1 is assumed to be essentially symmetrical, whereby an especially suitably adapted position of the center of mass 55 of the item of piece goods 5 for the driving maneuver to be carried out lies in the middle of the transport vehicle 1. This produces an essentially horizontal position of the load transfer means 3 embodied as a belt conveyor, thus a horizontal position of the support of the item of piece goods 5. Numerous other forms of embodiment are possible however, also those of transport vehicles with non-symmetrical mass distribution, in which the asymmetry is compensated for by an adaptation of the control variables of the control system 7, in particular by a control of the traction drive 23 and/or the load transfer drive 33.

Figure 6:
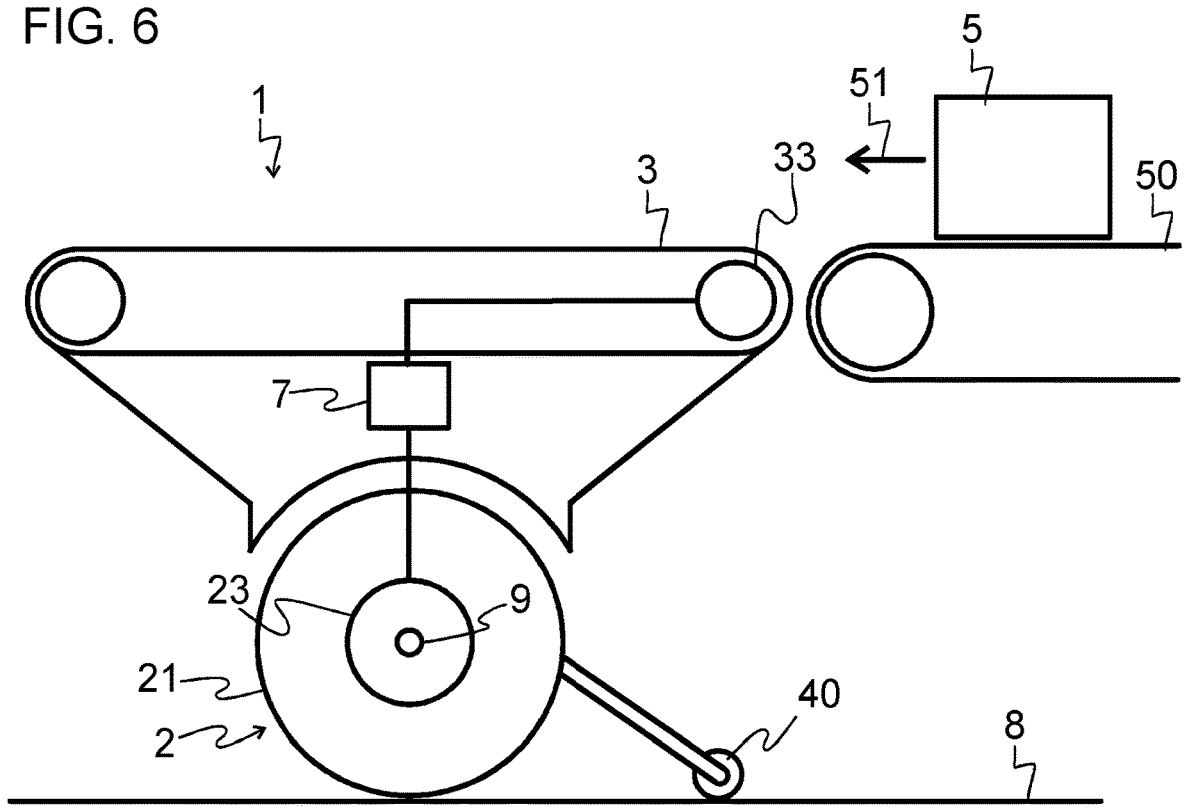
FIG. 6 shows a schematic side view of the transport vehicle shown in FIGS. 1-3, while it is being loaded automatically.

FIG. 6 shows how the transport vehicle 1 is automatically loaded with the item of piece goods 5 by a stationary conveyor facility 50. In this case the transport vehicle 1 positions itself adjacent to the stationary conveyor facility 50 so that the latter can convey the item of piece goods 5 onto the transport vehicle 1.

As can be seen in FIG. 6, the transport vehicle 1 additionally comprises a support wheel system 40, which is embodied, when the control system 7 is switched off, to ensure a stable state of the driverless transport vehicle 1. The support wheel system is able to be extended and retracted and, in the loading of the transport vehicle shown in FIG. 6, is extended, in order to capture leverages which can occur on the far outside of the transport vehicle during loading. As an alternative thereto the support wheel system 40 or a stand system can also be retracted, wherein the transport vehicle 1 is prevented from tilting about the axle 9 of the chassis 2 by a control of the traction drive 23 and the transport vehicle 1 is already balancing on the chassis 2 during the loading process, i.e. on only the two wheels 21 arranged on the axle 9.

In the process shown in FIG. 6 the transport vehicle 1 is positioned so that it is loaded from behind with the item of piece goods 5 by the belt conveyor 3. As an alternative thereto the transport vehicle 1 can also position itself adjacent to the conveyor facility 50 so that it can be loaded with the item of piece goods 5 by it from the side. In other exemplary embodiments the transport vehicle 1 can thus also be loaded from the side.

In addition or as an alternative to the load transfer means 3, the transport vehicle 1 can also comprise further conveyor means, which for example can also shift the general cargo 5 at an angle to the direction of travel of the transport vehicle 1 or parallel to the axle 9. For example in one variant, instead of the belt conveyor 3, the transport vehicle 1 can comprise a corner transfer unit, which allows the item of piece goods to be conveyed in the direction of travel of the transport vehicle as well as at right angles thereto, i.e. sideways on the support surface of the transport vehicle 1.

FIG. 7 shows a starting-off maneuver or an acceleration maneuver of the transport vehicle 1 respectively after said vehicle has been loaded as shown in FIG. 6 with the general cargo 5. In this case the load transfer means 3 is activated so that the position of the center of mass 55 of the item of piece goods 5 will be shifted in the direction of travel, until the driverless transport vehicle 1 leans forwards, i.e. in the intended direction of travel r of the transport vehicle 1. The common center of mass 35 of the transport vehicle 1 and item of piece goods 5 then lies in front of the axle 9 in the direction of travel, as can be seen from the dashed lines A and B. In order to prevent the transport vehicle 1 from tilting completely the transport vehicle 1 accelerates in the intended direction of travel r, in that the control system 7 controls the traction drive 33 and optionally also the load transfer drive so that the vehicle is accelerated in this inclined position up to the intended velocity v and balances during the acceleration a. Such a driving maneuver, compared to conventional single-axle controlled vehicle, equally has a number of advantages:

The transport vehicle 1 does not need to accelerate initially against the intended direction of travel r in order to bring about the inclination desired for moving in the intended direction of travel r. This enables more efficient starting-off;

Such an acceleration against the intended direction of travel r would not be or would scarcely be possible in the situation shown in FIG. 6, since the transport vehicle should be as close as possible to the stationary conveyor facility for loading;

During the entire acceleration process the inclination of the surface of the belt conveyor 3 can be controlled by the control system 7 so that it works against the inertia of the item of piece goods and this acts against a possible slippage on the belt conveyor against the intended direction of travel r, and thereby prevents the item of piece goods from possibly falling down at the back of the transport vehicle 1;

The support wheel system 40 is retracted during the acceleration maneuver.

FIG. 8 shows a driving maneuver when driving straight ahead. In this case the control system 7 controls the load transfer drive 33 so that the position of the center of mass 55 of the item of piece goods 5 causes slightly less of an inclination in the direction of travel than the acceleration maneuver shown with the aid of FIG. 7. When driving straight ahead at an essentially constant speed a total center of mass 35 of transport vehicle 1 and item of piece goods 5 lying somewhat in front of the axle 9 in direction of travel r is desired since, as a result of the air resistance and friction losses in the wheels 21 the traction drive 23 should still exert a torque on the wheels 21. In FIG. 8 this offset of the common center of mass 35 and axle 9 is visualized by the dashed lines A and C.

Figure 9:
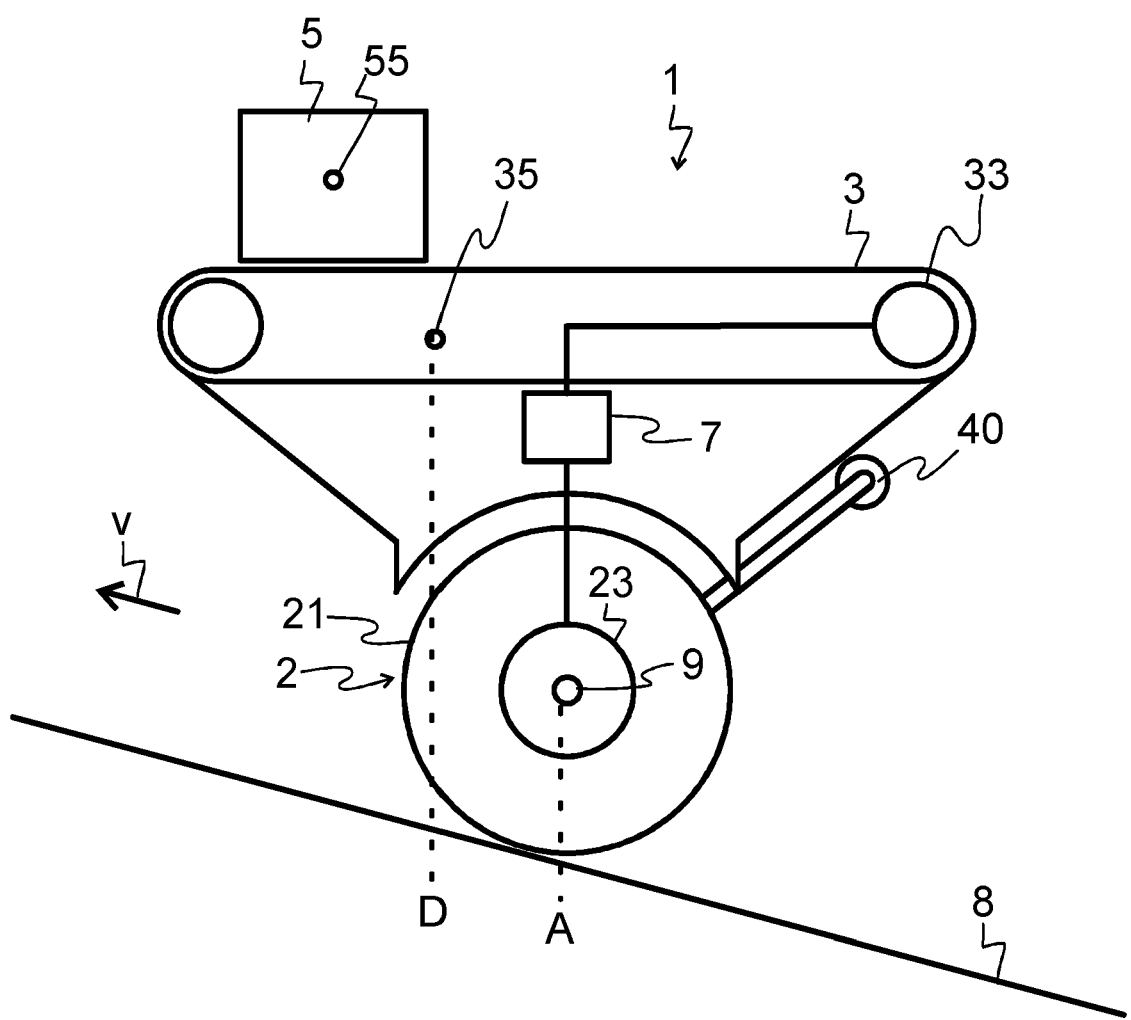
FIG. 9 shows a schematic side view of the transport vehicle shown in FIGS. 1-3, while it is driving up an incline.

FIG. 9 shows the transport vehicle 1 that is undertaking driving up an incline as a driving maneuver. In this case the control system 7 is embodied to activate the load transfer drive 33 so that the position of the center of mass of the item of piece goods 5 is shifted in the direction of travel or respectively that the total center of gravity 35 of the item of piece goods 5 and the transport vehicle 1 in the direction of travel lies in front of the axle 9, as can be seen by the dashed lines A and D. In accordance with a preferred form of embodiment, the position of the item of piece goods 5 can be set in this case so that the item of piece goods 5 lies horizontally on the receiving surface of the load transfer means 3.

Figure 10:
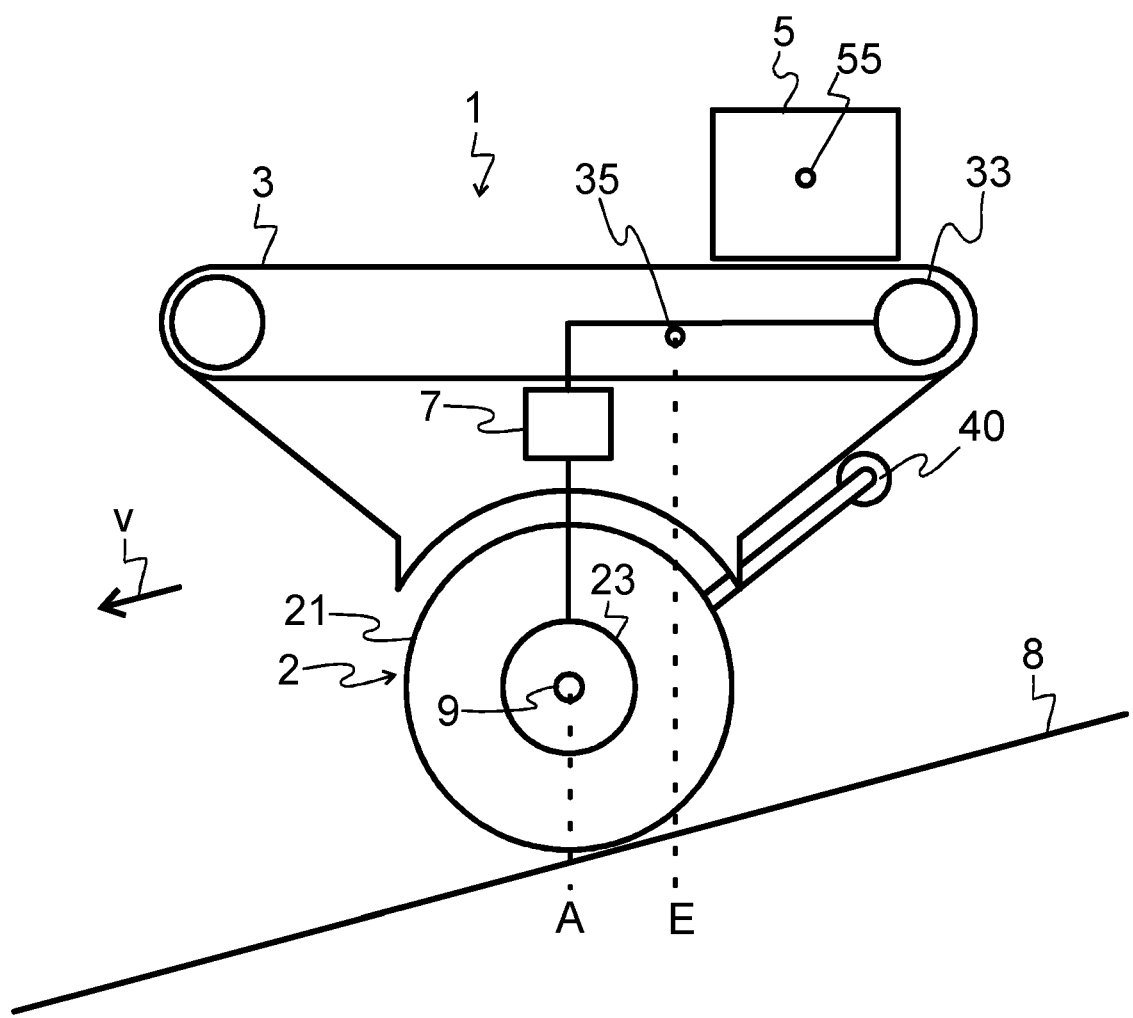
FIG. 10 shows a schematic side view of the transport vehicle shown in FIGS. 1-3, while it is driving down an incline.

FIG. 10 shows the transport vehicle 1 that is undertaking driving down an incline as a driving maneuver. In this case the control system 7 is embodied to activate the load transfer drive 33 so that the position of the center of mass 55 of the item of piece goods 5 is shifted against the direction of travel or respectively that the total center of gravity 35 of the item of piece goods 5 and the transport vehicle 1 in the direction of travel lies behind the axle 9, as can be seen by the dashed lines A and E. In accordance with a preferred form of embodiment, the position of the item of piece goods 5 can be set in this case so that the item of piece goods 5 lies horizontally on the receiving surface of the load transfer means 3.

Figure 11:
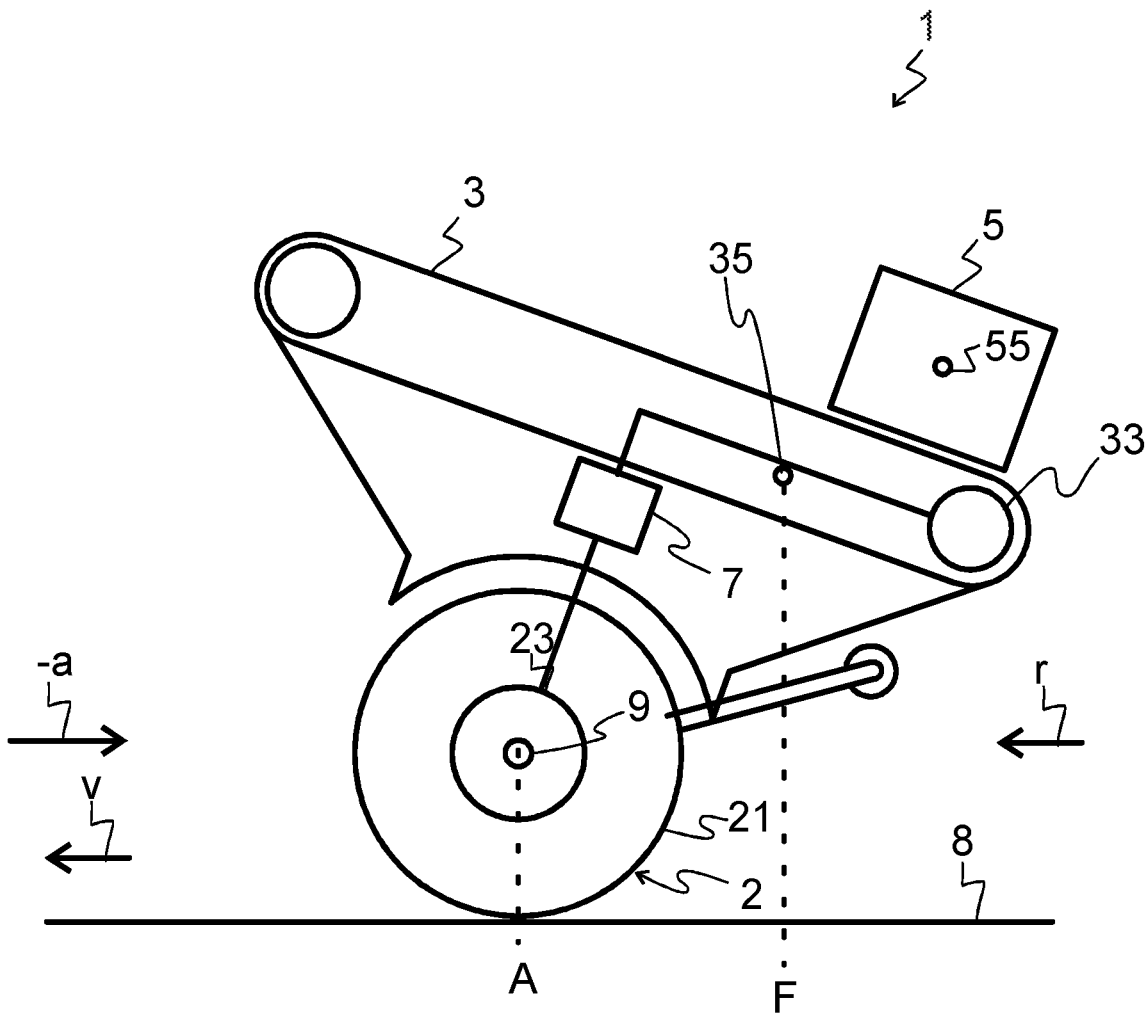
FIG. 11 shows a schematic side view of the transport vehicle shown in FIGS. 1-3 during a braking maneuver.

FIG. 11 shows a braking maneuver of the transport vehicle 1 loaded with the item of piece goods 5. In this case the load transfer means 3 is activated so that the position of the center of mass 55 of the item of piece goods 5 is shifted against the direction of travel r so that the driverless transport vehicle 1 tilts backwards, i.e. against the direction of travel r of the transport vehicle 1. The common mass center of gravity 35 of transport vehicle 1 and item of piece goods 5 then lies behind the axle 9, viewed in the direction of travel r, as can be seen from the dashed lines A and F. In order to avoid a complete tilting of the transport vehicle 1, the transport vehicle 1 brakes by the control system 7 controlling the one vehicle brake and also the load transfer drive 33 so that the vehicle 1 is braked in this tilted position down to an intended speed and during the braking process, which is represented by the negative acceleration −a acting on the wheel 21 at this point in time, is balanced. Such a driving maneuver, compared to a conventional single-axle controlled transport vehicle, equally has a number of advantages:

The transport vehicle 1 does not need to accelerate initially in the intended direction of travel r in order to bring about the inclination desired for the braking maneuver. The braking distance is thus shortened.

During the entire braking process the inclination of the surface of the belt conveyor 3 can be controlled by the control system 7 so that it acts against the inertia of the item of piece goods 5 and thus acts against a possible slippage on the belt conveyor in the direction of travel r, and thereby prevents the item of piece goods from possibly falling forwards on the transport vehicle 1.

The following is true for all the driving maneuvers shown in the figures: In order to adapt the position of the center of mass 55 of the item of piece goods 5 for a driving maneuver to be carried out it is not necessary to compute this position, but the position can also be set by control technology by the control system 7.

Figure 4:
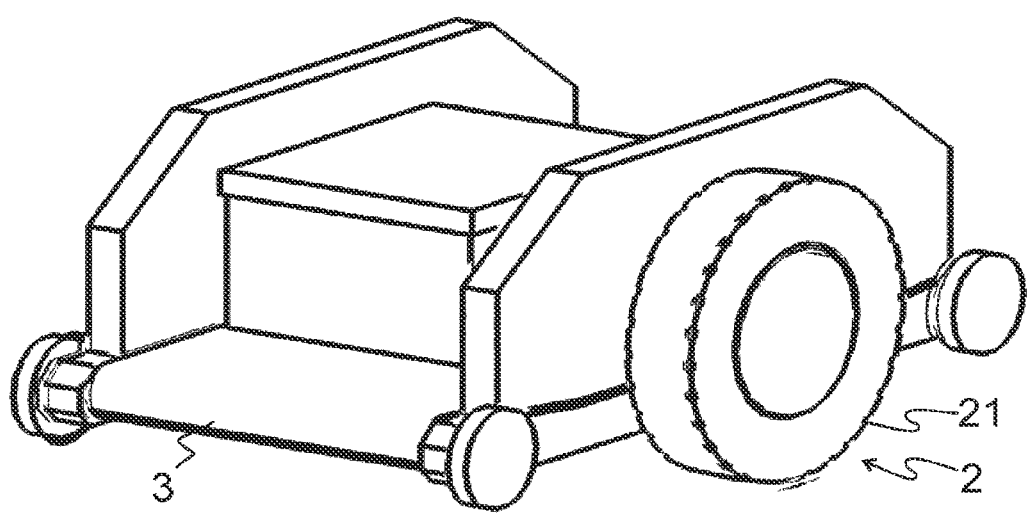
FIG. 4 shows a perspective view of a driverless transport vehicle in accordance with a further exemplary embodiment of the invention.

FIG. 4 shows a driverless transport vehicle 101 in accordance with a further exemplary embodiment of the invention, in which the load transfer means 3 is positioned lower, and for which the center of gravity of the transport vehicle 101 lies low down. This makes it possible to keep the transport vehicle in balance on the wheels more easily. The transport vehicle 101 moreover has side walls.

Figure 12:
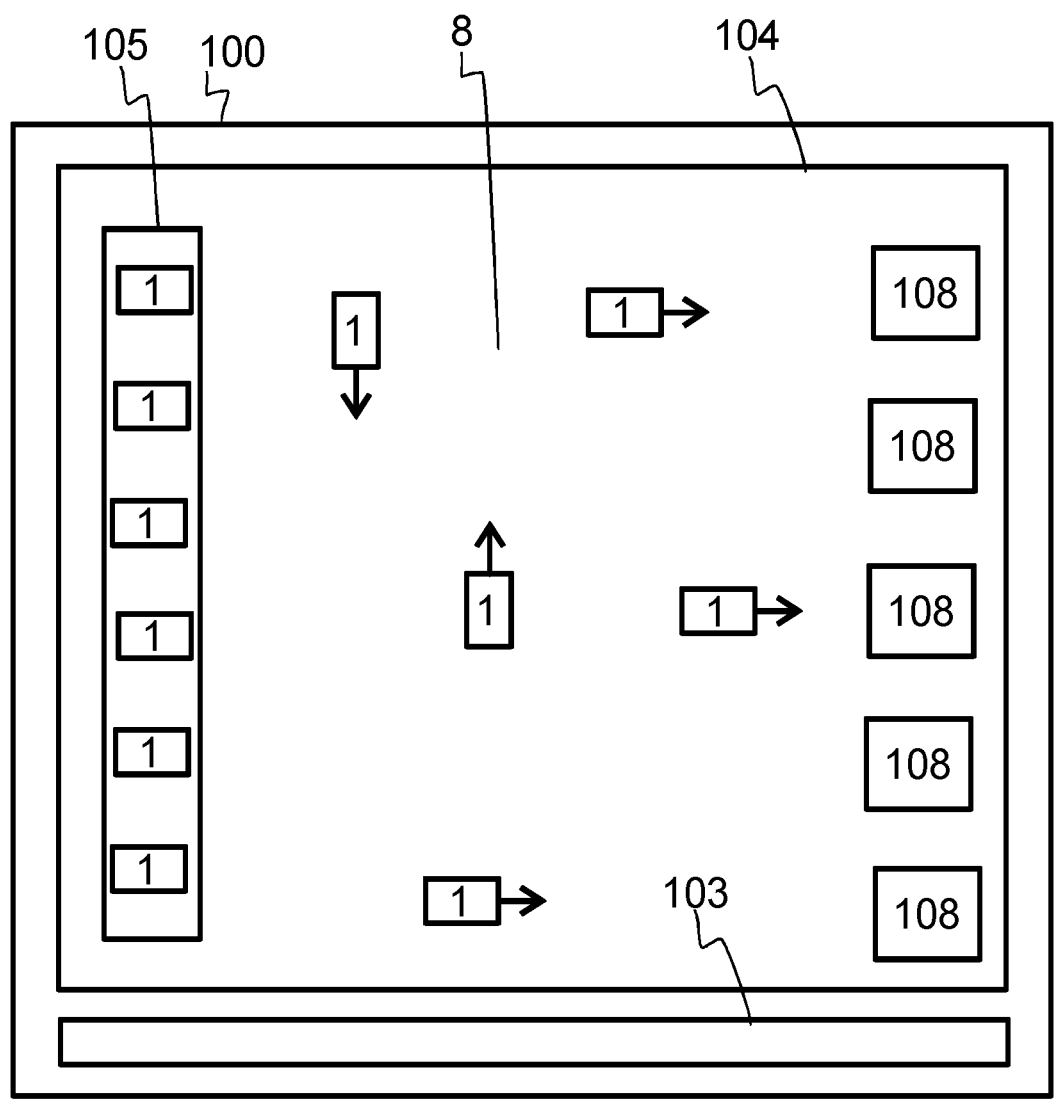
FIG. 12 shows a sorting system in accordance with an exemplary embodiment of the invention.

FIG. 12 shows a sorting system 100, which comprises a sorting area 104, a sorting logic 103 and a plurality of driverless transport vehicles 1. The sorting area 104 comprises at least one loading area 105 and sorting destinations 108. The loading area 105 is embodied to load the driverless transport vehicle 1 with general cargo. The sorting logic 103 is embodied to guide a transport vehicles 1 loaded with an item of piece goods 5 to a sorting destination 108 assigned to the item of piece goods 5 and to cause the transport vehicle 1 to discharge the item of piece goods into the sorting destination assigned to the item of piece goods.

Through the use of only one axle, a balancing active tilt stability system (inverse single pendulum, Segway® principle) and a center of gravity-shifting conveyor technology placed thereon (inverse double pendulum) further exemplary embodiments of the invention moreover make great mobility possible, since the transport vehicle can turn on the spot, a free navigation and also a free route optimization. Moreover a speed bandwidth is possible, for example from 1 m/s to 10 m/s. High-speed connecting routes can also be traveled. Forms of embodiment of the invention moreover allow a high independent climbing capability and also a high independence from uneven ground, which can be of particular advantage in airport terminals, aprons and parcel centers.

The mechanical simplicity of the vehicle enables the costs to be significantly reduced by comparison with known current AGV designs. The transport vehicle can be designed as a self-balancing, 1-axle, cross belt AGV for inhomogeneous general cargo.

Forms of embodiment of the invention are based on the combination of an active self-balancing 1-axle vehicle (Segway®, inverse single pendulum) and an active conveyor technology shifting the center of gravity placed thereon. The associated kinematic, control technology and physical circumstances for such a combination are known from the problem of the "inverse double pendulum".

Control of an inverse single pendulum is known and is documented in the YouTube® links cited by the applicant.

Control of a double pendulum is known and is documented in the YouTube® links cited by the applicant.

Forms of embodiment of such combinations allow a simple and flexible transport of general cargo with a Segway® principle, which would otherwise only be able to be realized with great restrictions and in a laborious manner.

Figure 13:
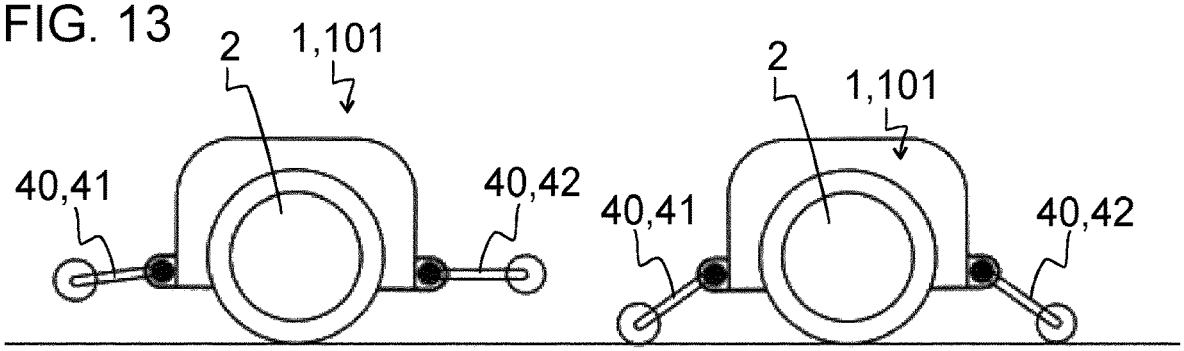
FIG. 13 shows a schematic side view of a driverless transport vehicle in accordance with a form of embodiment of the invention with an extendable support wheel system on a level route.

FIG. 13 shows a schematic side view of two identical driverless transport vehicles 1 in accordance with a form of embodiment of the invention with an extendable support wheel system 40 on a level route. The support wheel system comprises a front support wheel system 41 and a rear support wheel system 42 that, viewed in the direction of travel are attached to the front and the back of the transport vehicle 1. The driverless transport vehicle 1 shown on the left in FIG. 13 has the support wheel system 40 retracted and balances with the aid of the control system 7 on the chassis 2. The driverless transport vehicle 1 shown on the right in FIG. 13 has the support wheel system 40 extended and therefore does not need any control in order not to tip over. With extended support wheel system 40 the transport vehicle 1 can be parked. With extended support wheel system 40 the transport vehicle 1 can be parked but can also transport general cargo with reduced energy consumption, since in this case the energy necessary for the control of the balancing can be saved. This can be useful especially for negotiating longer, less challenging routes, especially routes without steps.

For start-off and driving of the transport vehicle 1, by the active tilting the support legs 41, 42 can be automatically and passively raised and fixed in the end position reached, by means of a ratchet for example. By a reversal of the ratchet the transport vehicle 1 can be stabilized again.

The control system 7 can be embodied and adapted, when the transport vehicle 1 stops, to let the support wheels 41, 42 fall onto the route by releasing and reversing the ratchet function and to latch them there so that the transport vehicle 1 stands stabilized in the respective position in any climbing situation. This is illustrated in FIGS. 14-16.

Figure 14:
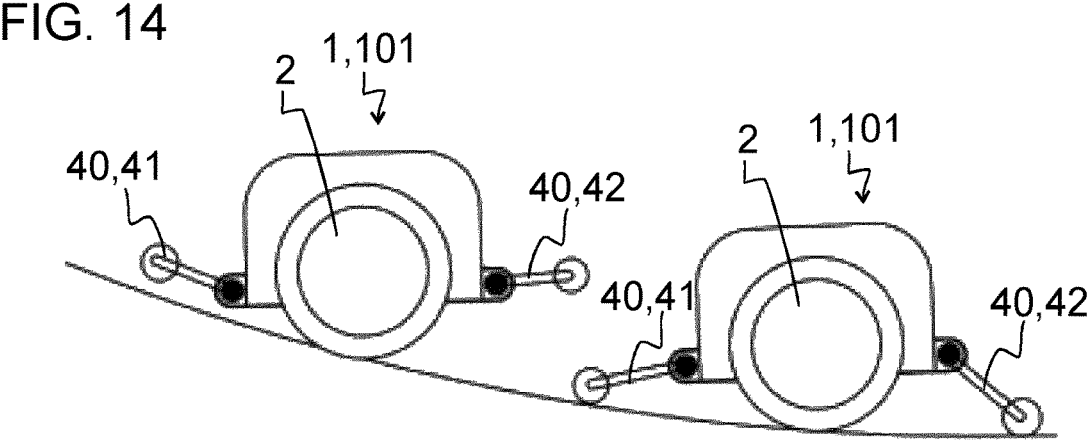
FIG. 14 shows a schematic side view of the driverless transport vehicle from FIG. 13 on a concave route.

FIG. 14 shows two identical transport vehicles 1 from FIG. 13 on a concave route. The transport vehicle 1 on the right has been stabilized by the extended support wheel systems 41, 42.

Figure 15:
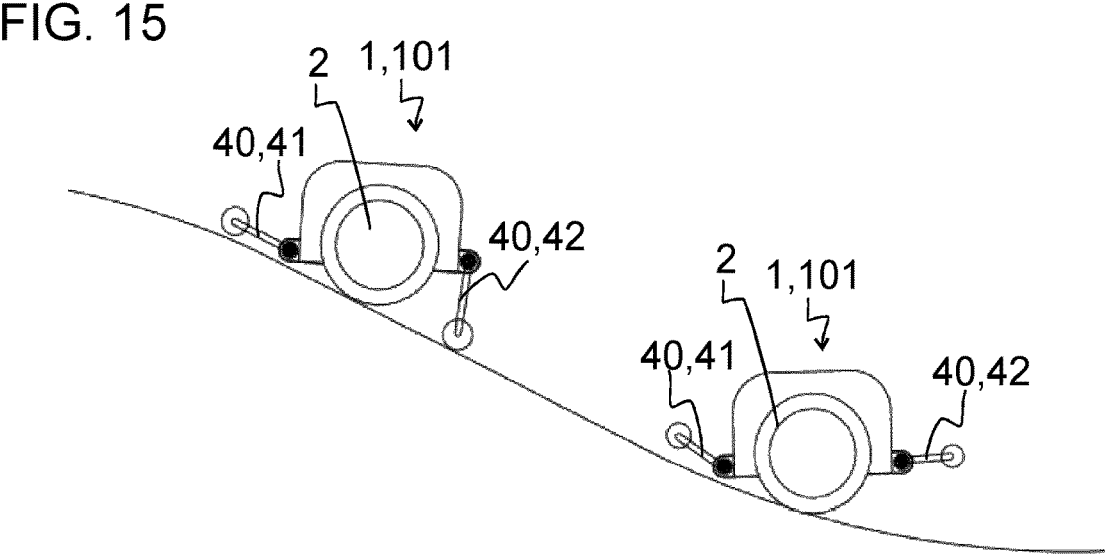
FIG. 15 shows a schematic side view of the driverless transport vehicle from FIG. 13 on a route with a descent or an ascent respectively.

FIG. 15 shows two identical transport vehicles 1 from FIG. 13 on a route with an ascent/descent. The transport vehicle 1 on the left has been stabilized by the extended support wheel system 41, 42.

Figure 16:
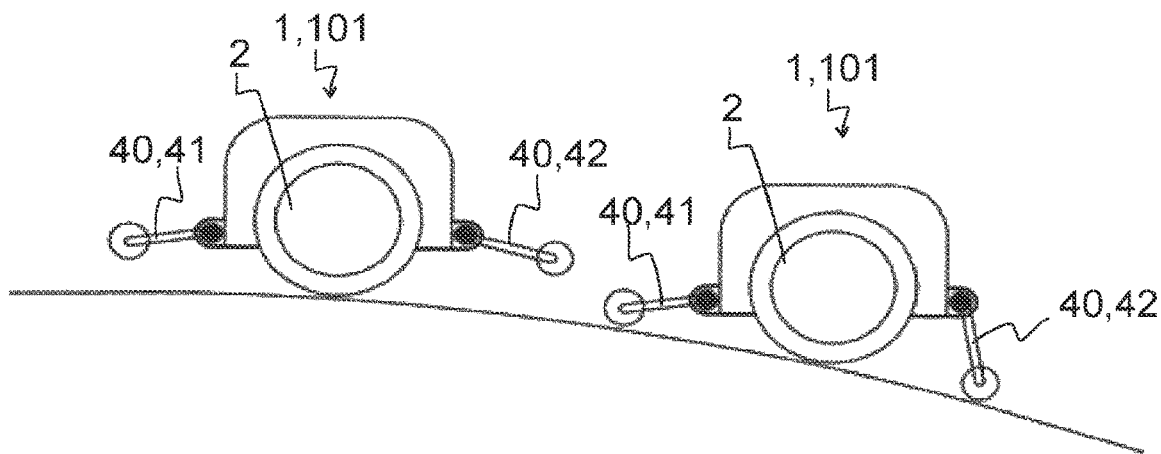
FIG. 16 shows a schematic side view of the driverless transport vehicle from FIG. 13 on a convex route.

FIG. 16 shows two identical transport vehicles 1 from FIG. 13 on a convex route. The transport vehicle 1 on the right has been stabilized by the extended support wheel systems 41, 42.

Figure 17:
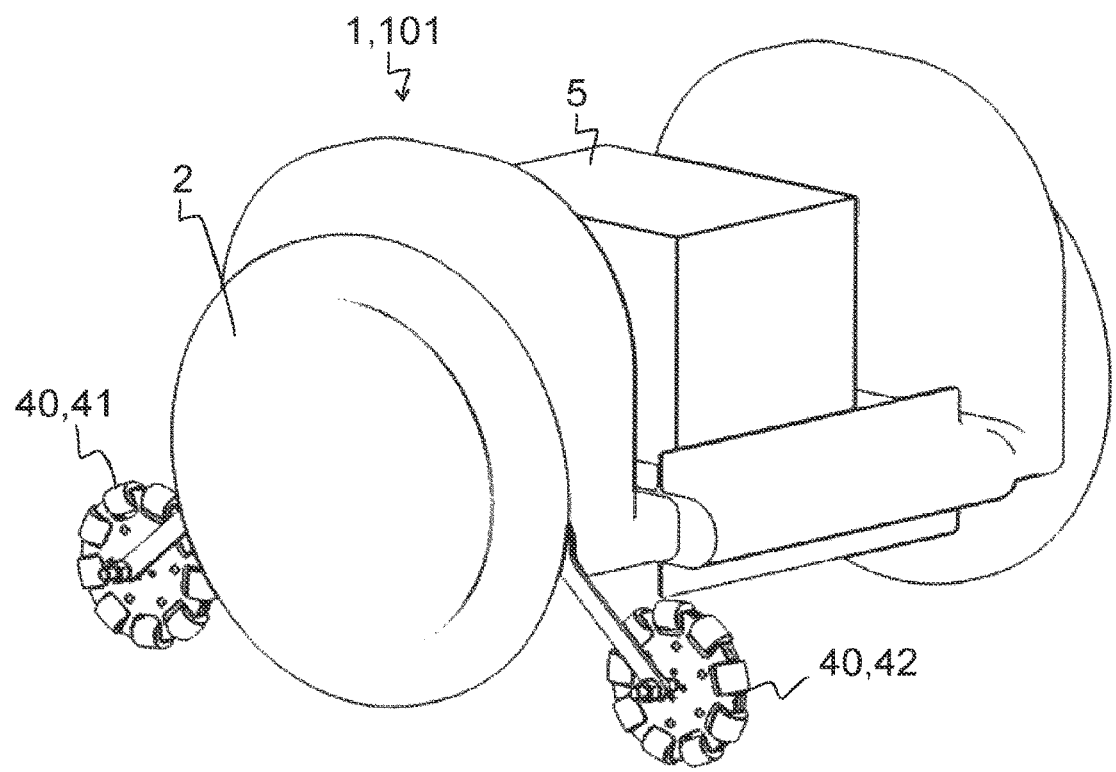
FIGS. 17 and 18 show perspective views of the driverless transport vehicle from FIG. 13.

FIG. 17 shows a perspective view of a transport vehicle 1 shown in FIG. 13, wherein both support wheel systems 41, 42 are extended and support the transport vehicle 1 on the route. In this mode the control system 7 can be inactive.

Figure 18:
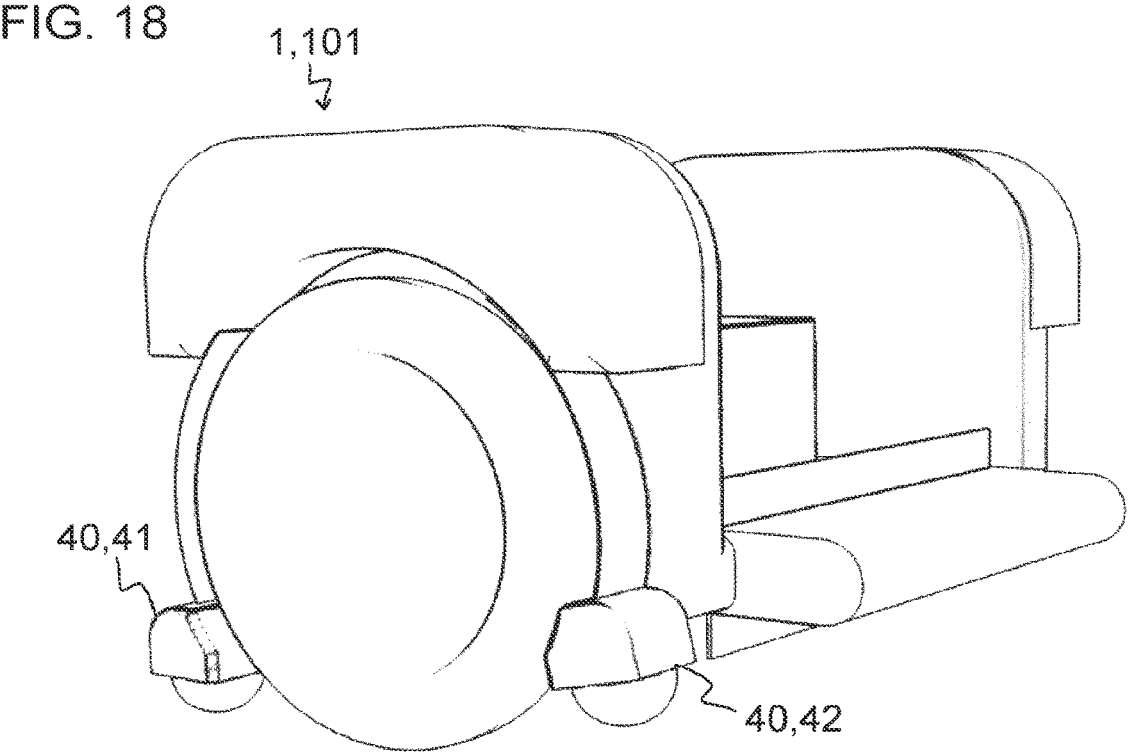

FIG. 18 shows a perspective view of a variant of the transport vehicle from FIG. 17, in which both support wheel systems 41, 42 are retracted and therefore are not touching the route. The transport vehicle 1 balances with the aid of the control system 7.

Figure 19:
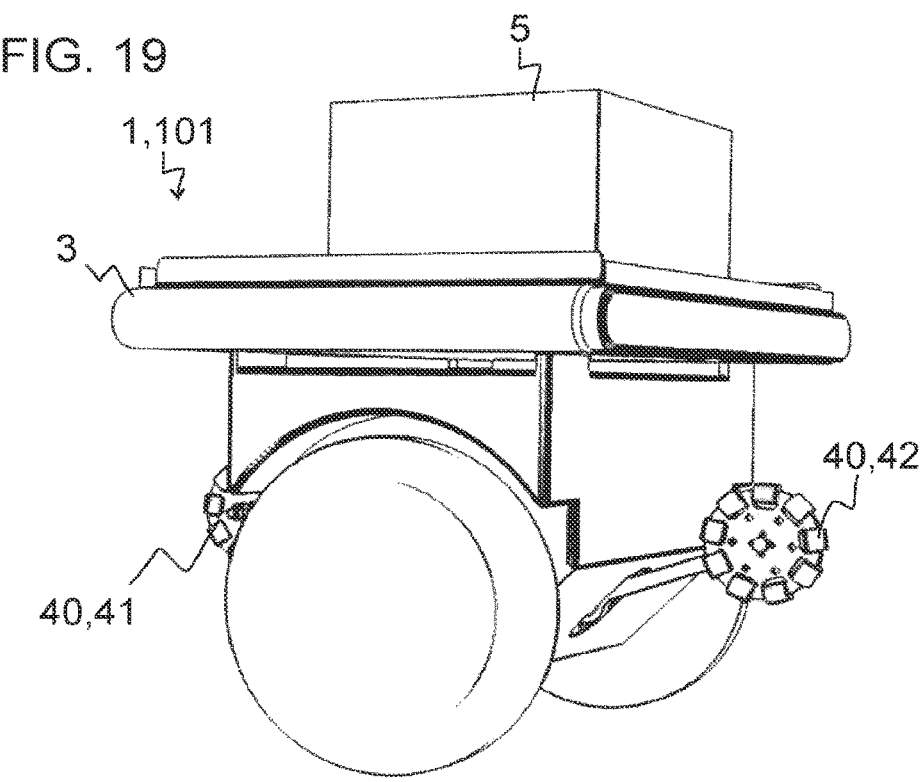
FIG. 19 shows a perspective view of a variant of a driverless transport vehicle in accordance with a form of embodiment of the invention.

FIG. 19 shows a variant of the transport vehicle 1 with a load transfer means 3 that can move general cargo 5 transverse to the direction of travel of the transport vehicle 1 in a perspective view.

Figure 20:
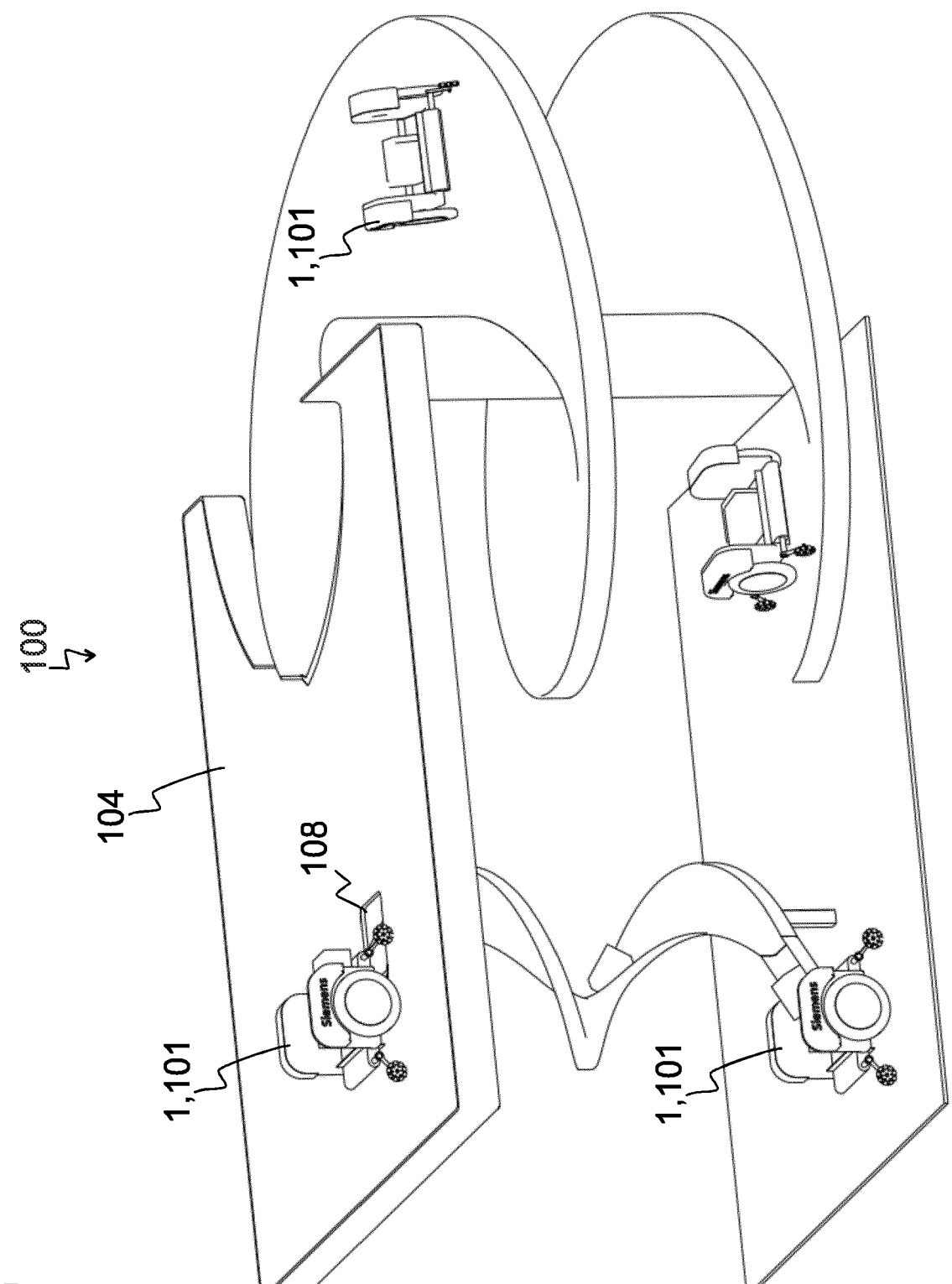
FIGS. 20 and 21 show variants of sorting systems in accordance with forms of embodiment of the invention.

FIG. 20 shows a variant of a concept of a sorting system 100, which extends over two sorting levels arranged in parallel vertically above one another. The sorting system 100 comprises a track in the shape of a helix over which the transport vehicles 1 can move from one sorting level to the other sorting level. The sorting system moreover comprises a helical slide, via which the transport vehicles discharge general cargo from the upper of the two sorting levels to the lower level and transfer it there to a further transport vehicle 1.

Figure 21:
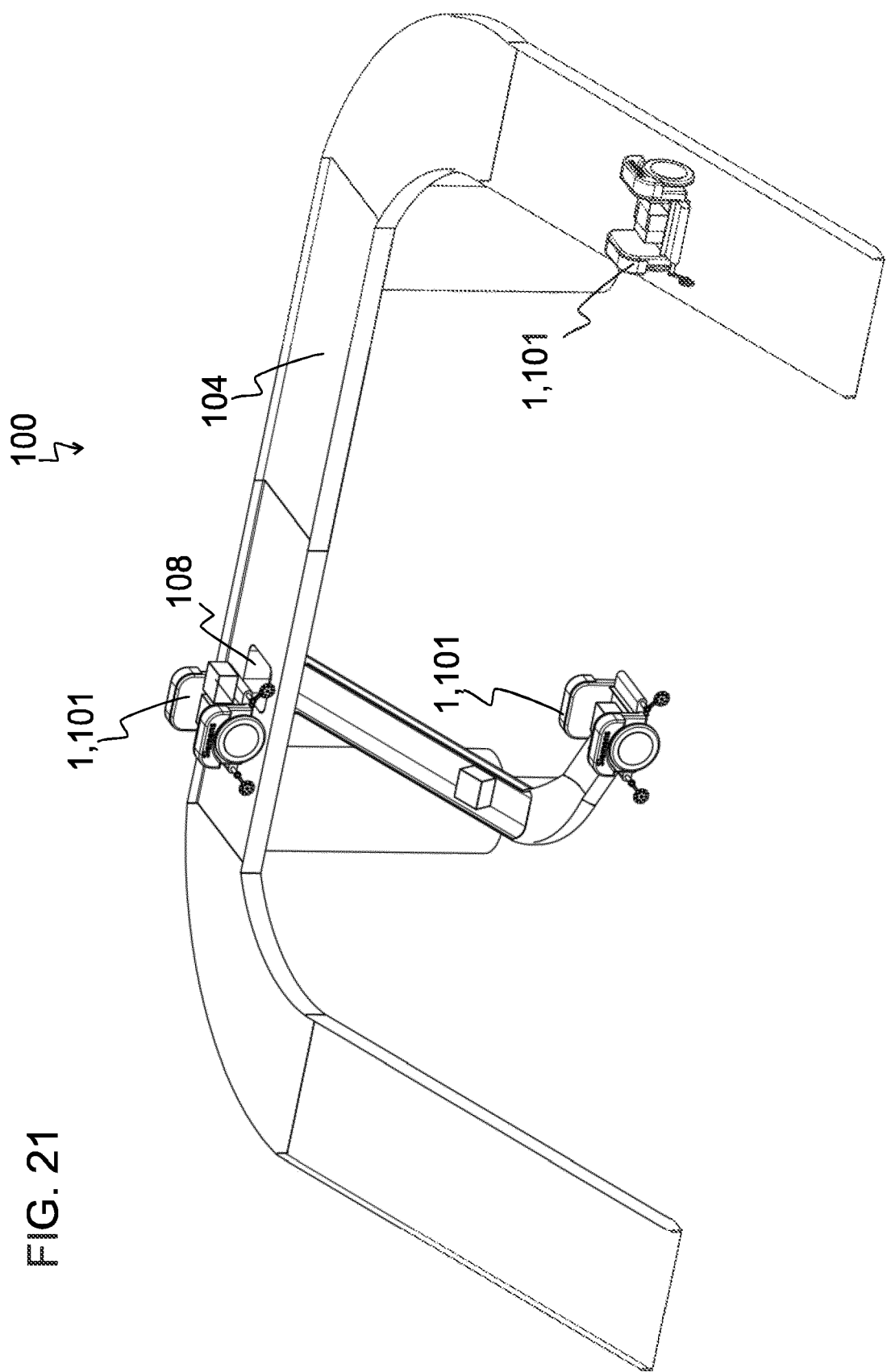

FIG. 21 shows a perspective view of a further variant of a concept of a sorting system in a perspective view. In this variant the slides and the tracks connecting the sorting levels arranged above one another are not helical, but are embodied straight.

Figure 22:
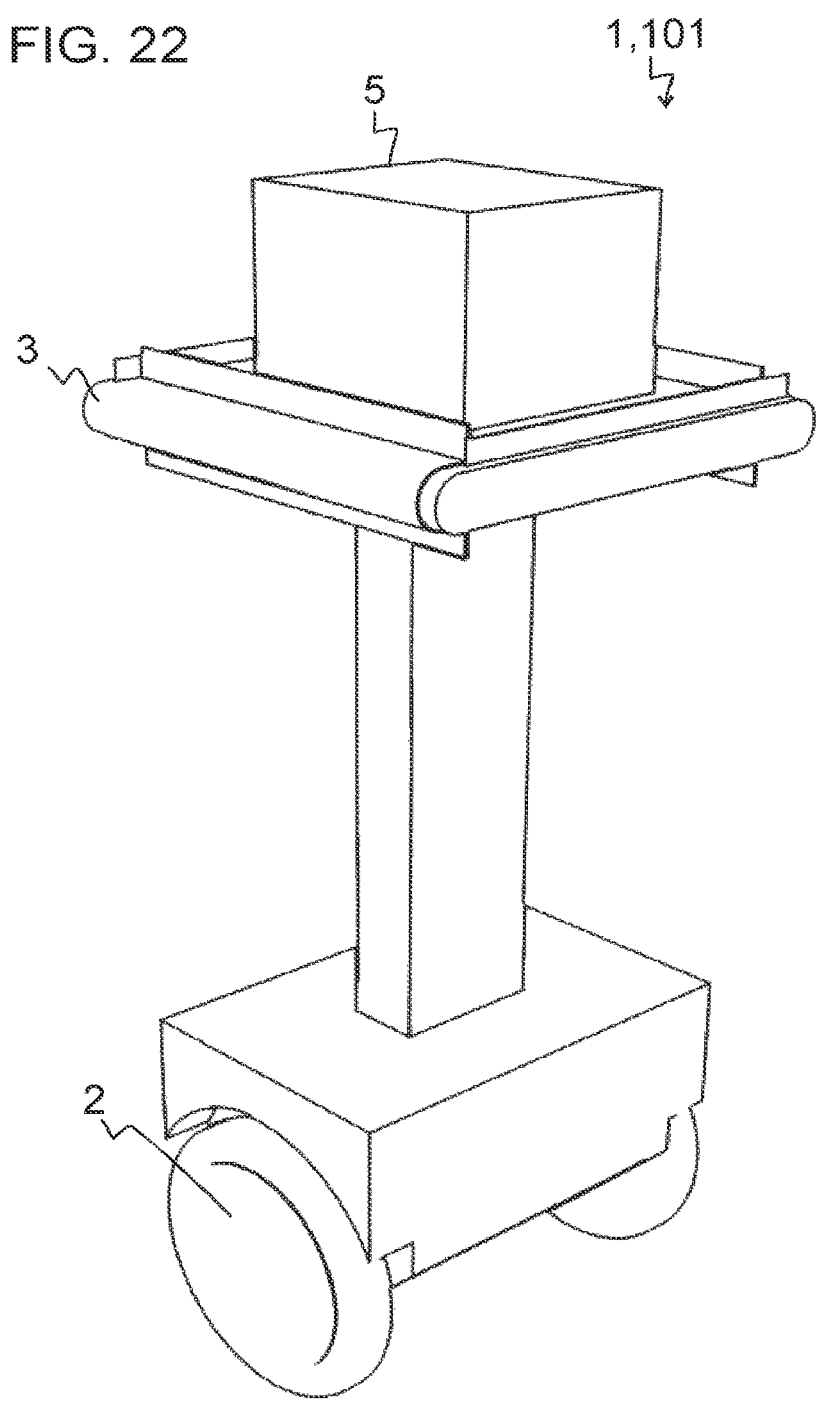
FIG. 22 shows a perspective view of a further variant of a driverless transport vehicle in accordance with a form of embodiment of the invention.

FIG. 22 shows a variant of the transport vehicle 1 shown in FIG. 20 in a perspective view with a load transfer means 3 arranged higher up.

Further forms of embodiment emerge from the following features:

The support wheels 40, 41, 42 are embodied as "omniwheels" or trailing wheels, i.e. in the extended state the self-balancing AGV can still steer in any direction in the level.

The support wheels 40, 41, 42 are extended where necessary by gravity or with the aid of springs.

A controllable ratchet for the front wheel 41 and rear wheel 42 makes possible adaptation to any angle of incline that the transport vehicle 1 is currently driving on.

An active reversal of the ratchet releases the wheel supports 40, 41 and latches these again when the self-balancing AGV tilts in a position above the route (balancing mode).

The necessary force for support is realized purely mechanically and not by actively driven actuators.

Instead of a ratchet a force-controlled brake can also be used here.

The support wheel systems 40, 41, 42 can comprise a passive latching of the support wheels after the gravity or spring release in any position and driving situation of the transport vehicle 1, so that the self-balancing AGV is prevented from tipping over.

The support wheel systems 40, 41, 42 can comprise a passive self-resetting of the support wheels when the transport vehicle 1 starts off through the tilting of the self-balancing AGV after reversal of the ratchet function.

Location measurement (tilt angle of the self-balancing AGV).

Measurement of the route in front of and behind the transport vehicle 1.

Active proportionally controlled adjustment elements and control circuits for the support wheels on the front and rear side of the transport vehicle 1.

The transport vehicle 1 possesses functional and stable support wheels that are embodied as omniwheels or trailing wheels, i.e. in the extended state the transport vehicle 1 can steer in any direction on the level and thus imitates a classical driverless transport vehicle.

The support wheels are where necessary extended actively by actuators or passively by gravity or with the aid of springs.

To do this a hybrid control switches actively from the balancing control to a simple and known differential drive control, when the balancing method of travel is not required or is disadvantageous.

The control system 7 is embodied and adapted to switch over from a self-balancing system to a differential drive system (tank drive) and back, depending on the driving task, transport task and route situation in a driverless transport vehicle-based driverless transportation system or general cargo sorting system.

The driverless transport vehicle 1 can comprise a hybrid structure of the drive and chassis kinematics and the control technology.

At least the solutions for the transport vehicle, the sorting system and their uses based on claims 13-18, 20-23 also function without the feature according to which the control system must moreover be embodied to activate the load transfer drive so that the position of the center of mass of the general cargo is adapted for a driving maneuver which is to be carried out.

The invention claimed is:

1. A driverless transportation vehicle for piece goods, the transportation vehicle comprising:
   a chassis with at least two wheels arranged on an axle;
   a traction drive for driving said at least two wheels;
   a load transfer device having a load transfer drive, said load transfer device being configured to receive an item of cargo and to shift a center of mass thereof on the driverless transportation vehicle; and
   a control system configured to control said traction drive so that a tilting of the transportation vehicle about said axle of said chassis is prevented while the transportation vehicle balances only on said at least two wheels, said control system being configured to control said load transfer drive so that a position of the center of mass of said item of piece goods is adapted for a driving maneuver to be carried out;
a support wheel system configured to ensure a stable stance of the driverless transportation vehicle, and wherein said support wheel system is configured, in an extended state, to allow the transportation vehicle to steer in any direction on a driving surface; and
at least one controllable ratchet or force-controlled brake, which is arranged in an articulated joint of said support wheel system and which is configured, in an extended state thereof, to keep on or more wheels of said support wheel system in position on the ground.

2. The driverless transportation vehicle according to claim 1, wherein said load transfer device is a conveyor selected from the group consisting of a conveyor line, a conveyor belt, a belt conveyor, and a roller conveyor.

3. The driverless transportation vehicle according to claim 1, wherein said at least two wheels are individually driven wheels.

4. The driverless transportation vehicle according to claim 1, wherein the chassis has precisely two wheels mounted on the axle laterally to the side on the driverless transportation vehicle.

5. The driverless transportation vehicle according to claim 1, wherein said load transfer device is configured to transfer the center of mass of the piece goods on the driverless transportation vehicle in a direction of travel and against the direction of travel.

6. The driverless transportation vehicle according to claim 1, further comprising a support wheel system or a stand system, configured to ensure, when said control system is switched off, a stable stance of the driverless transportation vehicle.

7. The driverless transportation vehicle according to claim 6, wherein said control system is embodied to selectively extend or retract said support wheel system or said stand system for a driving maneuver to be carried out.

8. The driverless transportation vehicle according to claim 1, wherein the driving maneuver comprises driving on an incline and said control system is configured to control said load transfer drive for driving on the incline to shift a position of the center of mass of the item of piece goods in or against a direction of travel.

9. The driverless transportation vehicle according to claim 1, wherein the driving maneuver comprises a braking maneuver and said control system is configured to control said load transfer drive for the braking maneuver to shift a position of the center of mass of the item of piece goods against a direction of travel.

10. The driverless transportation vehicle according to claim 1, wherein the driving maneuver comprises a starting or acceleration maneuver and said control system is configured to control said load transfer drive for the starting or acceleration maneuver to shift a position of the center of mass of the item of piece goods in a direction of travel.

11. The driverless transportation vehicle according to claim 1, wherein said control system is configured to control said load transfer drive and/or said traction drive so that a receiving surface of the load transfer device on which the item of piece goods rests, assumes a predetermined angle of inclination or comes to rest horizontally.

12. The driverless transportation vehicle according to claim 1, wherein said control system is configured to activate said load transfer drive so that a position of the center of mass of the item of piece goods is adapted for the driving maneuver to be carried out while the driverless transportation vehicle balances on only said at least two wheels.

13. The driverless transportation vehicle according to claim 1, wherein said support wheel system is configured to be extended by a force of gravity or aided by springs.

14. The driverless transportation vehicle according to claim 1, further comprising a support wheel system configured to ensure a stable stance of the driverless transportation vehicle, said support wheel system comprising a front support wheel system and a rear support wheel system, which are configured, in an extended state thereof, to support the transportation vehicle in a direction of travel forwards and backwards adapted to an angle of inclination of a given travel route.

15. The driverless transportation vehicle according to claim 1, wherein said at least one controllable ratchet or force-controlled brake each comprises a wheel support and is embodied to release said wheel supports and to latch said wheel supports in a position above the route when the driverless transportation vehicle is tilting.

16. The driverless transportation vehicle according to claim 6, wherein the transportation vehicle is configured to generate a force necessary for extending said support wheel system or said stand system purely mechanically.

17. The driverless transportation vehicle according to claim 1, wherein said control system is configured to activate said load transfer drive so as to adapt a position of the center of mass of the item of piece goods individually for different driving maneuvers to a given driving maneuver to be carried out.

18. The driverless transportation vehicle according to claim 6, wherein said control system is deactivated when said support wheel system is extended.

19. A driverless transportation vehicle for piece goods, the transportation vehicle comprising:
a chassis with at least two wheels arranged on an axle; a traction drive for driving said at least two wheels;
a load transfer device having a load transfer drive, said load transfer device being configured to receive an item of cargo and to shift a center of mass thereof on the driverless transportation vehicle;
a control system configured to control said traction drive so that a tilting of the transportation vehicle about said axle of said chassis is prevented while the transportation vehicle balances only on said at least two wheels, said control system being configured to control said load transfer drive so that a position of the center of mass of said item of piece goods is adapted for a driving maneuver to be carried out; and
a support wheel system configured to ensure a stable stance of the driverless transportation vehicle, and when said support wheel system is extended, said control system is configured to activate said traction drive in a non-balancing mode.

20. A driverless transportation vehicle for piece goods, the transportation vehicle comprising:
a chassis with at least two wheels arranged on an axle; a traction drive for driving said at least two wheels;
a load transfer device having a load transfer drive, said load transfer device being configured to receive an item of cargo and to shift a center of mass thereof on the driverless transportation vehicle;
a control system configured to control said traction drive so that a tilting of the transportation vehicle about said axle of said chassis is prevented while the transportation vehicle balances only on said at least two wheels said control system being configured to control said load transfer drive so that a position of the center of mass of said item of piece goods is adapted for a driving maneuver to be carried out; and a support wheel system configured to ensure a stable stance of the driverless transportation vehicle, and when said support wheel system is extended, said control system is configured to activate said traction drive as a differential drive control.

21. The driverless transportation vehicle according to claim 1, wherein said load transfer device is configured to discharge the item of piece goods from the transportation vehicle.

22. A sorting system, comprising:
a sorting area, a sorting logic, and a plurality of driverless transportation vehicles each according to claim 1;
said sorting area having at least one loading area and sorting destinations;
said at least one loading area being configured to load said driverless transportation vehicles with piece goods; and
said sorting logic being embodied to guide a transportation vehicle loaded with an item of piece goods to a respective sorting destination that is assigned to receive the piece goods.

23. The sorting system according to claim 22, wherein each of said driverless transportation vehicles is configured for at least one of transporting, distributing, or sorting items of piece goods.

24. The sorting system according to claim 23, wherein the items of piece goods are items of baggage or packages.

* * * * *

UNITED STATES PATENT AND TRADEMARK OFFICE
CERTIFICATE OF CORRECTION

PATENT NO. : 11,884,338 B2
APPLICATION NO. : 17/432560
DATED : January 30, 2024
INVENTOR(S) : Enenkel et al.

It is certified that error appears in the above-identified patent and that said Letters Patent is hereby corrected as shown below:

In the Specification

Column 1, Line 48:
After "rover)" insert -- ; --

Column 10, Line 10:
"vehicles" should be – vehicle –

In the Claims

Column 12, Claim 1, Line 63:
Delete "and"

Column 13, Claim 1, Line 13:
"on" should be – one –

Column 13, Claim 11, Line 61:
After "device" insert -- , --

Column 14, Claim 19, Line 36:
After "axle;" insert -- ¶ --

Column 14, Claim 20, Line 57:
After "axle;" insert -- ¶ --

Column 14, Claim 20, Line 66:
After "wheels" insert -- , --

Column 15, Claim 22, Line 17:
"destinations" should be – destination –

Signed and Sealed this
Eighteenth Day of June, 2024

Katherine Kelly Vidal
*Director of the United States Patent and Trademark Office*